(12) United States Patent
Cazanas et al.

(10) Patent No.: US 8,315,925 B1
(45) Date of Patent: Nov. 20, 2012

(54) SHUTTING DOWN PRIMARY CHARGE COLLECTION FUNCTION (CCF) WITHOUT CREATING INCOMPLETE SETS OF CHARGING DATA RECORDS (DR) IN PRIMARY AND SECONDARY CCFS

(75) Inventors: Carlos A. Cazanas, Bethlehem, PA (US); Paul Siedelhofer, Robbinsville, NJ (US); Marc Chiaverini, Mine Hill, NJ (US); James E. Haley, Aston, PA (US)

(73) Assignee: Cellco Partnership, Basking Ridge, NJ (US)

( * ) Notice: Subject to any disclaimer, the term of this patent is extended or adjusted under 35 U.S.C. 154(b) by 42 days.

(21) Appl. No.: 12/959,002

(22) Filed: Dec. 2, 2010

(51) Int. Cl.
*G07B 17/00* (2006.01)
*G07F 19/00* (2006.01)

(52) U.S. Cl. ............ 705/30; 705/40; 455/406; 709/224; 709/228

(58) Field of Classification Search ................. None
See application file for complete search history.

(56) References Cited

U.S. PATENT DOCUMENTS

| 7,346,697 | B2 * | 3/2008 | Zhang et al. .......... 709/230 |
| 7,840,215 | B2 * | 11/2010 | Panda et al. .......... 455/435.1 |
| 2010/0304710 | A1 * | 12/2010 | Sharma et al. .......... 455/406 |
| 2011/0066530 | A1 * | 3/2011 | Cai et al. .......... 705/30 |

* cited by examiner

*Primary Examiner* — Luna Champagne

(57) ABSTRACT

A shutdown notice may indicate that a primary CCF system is expected to shutdown soon. This notice may be received by a CTF system after the CTF system delivers an ACR Start message to the primary CCF system, but before it delivers an ACR Stop message relating to the same chargeable session to the primary CCF system. In response to this shutdown notice, the CTF system may be configured to deliver an ACR Stop message relating to the same chargeable session to the primary CCF system before the primary CCF system shuts down. Also in response to this shutdown notice, the CTF system may be configured to deliver an additional ACR Start message and an ACR Stop message relating to the same chargeable session to a secondary CCF system.

15 Claims, 3 Drawing Sheets

SHUTTING DOWN PRIMARY CHARGE COLLECTION FUNCTION (CCF) WITHOUT CREATING INCOMPLETE SETS OF CHARGING DATA RECORDS (DR) IN PRIMARY AND SECONDARY CCFS

BACKGROUND

1. Technical Field

This disclosure relates to Account Request (ACR) messages for chargeable sessions in a computer network system.

2. Description of Related Art

Chargeable sessions may occur in a computer network system when used by subscribers. For example, some subscribers may be charged for data usage in connection with a cellular data network system.

Various systems in the computer network system may each generate a set of Account Requests (ACR) messages relating to a chargeable session. These systems are commonly referred to as Charge Trigger Function (CTF) systems. For each chargeable session, the CTF system may generate an ACR Start message indicating the start of the chargeable session, one or more ACR Interim messages each indicating continuation of the chargeable session, and an ACR Stop message indicating the end of the chargeable session.

During normal operation, the CTF system may direct each set of ACR messages to a primary Charge Collection Function (CCF) system. The CCF system may be configured to receive and correlate ACRs and to generate a Charging Data Record (CDR) for each set of ACR messages relating to the chargeable session.

The CCF system may need to be shut down for maintenance and/or upgrades. When this happens, the flow of ACR messages to the CCF system from a particular CTF system may be disrupted. Following the shutdown, therefore, the remaining ACR Interim messages and the Stop message may be sent to a secondary CCF system. This may result in two incomplete CDRs, one on the primary CCF system, and one on the secondary CCF system.

Efforts may be made to locate and correlate these incomplete CDRs on the different CCF systems. This effort can require a significant amount of processing, which can be costly. Matching all of the incomplete CDRs, moreover, may not always be possible, resulting in lost revenue for otherwise chargeable sessions.

SUMMARY

A computer network system may generate Charging Data Records (CDRs). Each CDR may provide information about a chargeable session in the network system. Each CDR may be based on a set of Account Request (ACR) messages relating to the chargeable session. Each set may include at least an ACR Start message indicating the start of the chargeable session and an ACR Stop message indicating the end of the chargeable session.

The computer network system may include a primary Charge Collection Function (CCF) system and a secondary CCF system, each configured to receive and correlate ACRs and to generate CDRs. Each CDR may be based on a received set of ACRs relating to the same chargeable session.

The computer network system may include a Charging Trigger Function (CTF) system. The CTF system may be configured to generate sets of ACRs and to normally deliver each set to the primary CCF system.

A shutdown notice may indicate that the primary CCF system is expected to shutdown soon. This notice may be received by the CTF system after the CTF system delivers an ACR Start message to the primary CCF system, but before it delivers an ACR Stop message relating to the same chargeable session to the primary CCF system.

In response to this shutdown notice, the CTF system may be configured to deliver an ACR Stop message relating to the same chargeable session to the primary CCF system before the primary CCF system shuts down. Also in response to this shutdown notice, the CTF system may be configured to deliver any additional charging events for the same or new usage via additional ACR messages to the secondary CCF system until ACR Stop is issued when usage ends.

The set of ACR messages may include an ACR Interim message between the ACR Start and Stop messages indicating the continuation of the chargeable session. The shutdown notice may be received before the ACR interim message is sent. The CTF system may be configured after receipt of the shutdown notice not to deliver the ACR Interim message to the primary CCF system, but to deliver it to the secondary CCF system.

The CTF system may be a Serving Gateway (SGW), a Packet Data Network Gateway (PGW), or a system providing Application Services (AS).

The CTF system may be part of a Long Term Evolution (LTE) network and/or an evolved High Rate Packet Data (eHRPD) network.

The computer network system may include a plurality of primary CCF systems, a plurality of secondary CCF systems, and/or a plurality of CTF systems, each configured as recited above. In the case of multiple CTF systems, at least one of the CTF systems may be part of an LTE network and at least one of the CTF systems may be part of an eHRPD network.

The primary CCF system may be configured, in response to the shutdown notice, to generate a list of all CDRs which have been started by a received ACR Start message but not completed by the receipt of a received ACR Stop message relating to the same chargeable session. The primary CCF system may in addition or instead be configured, in response to the shutdown notice, to generate a list of all open, inbound TCP connections from the CTF systems.

The shutdown notice may not cause any incomplete sets of ACR messages to be received on the primary CCF system and/or the secondary CCF system.

The primary CCF system may be configured to deliver the shutdown notice upon user request. The primary CCF system may be configured to deliver the shutdown notice to each of the CTF systems which, at the time the shutdown notice is delivered, has delivered to the primary CCF system an incomplete set of ACR messages and/or has an open, inbound TCP connection to the CCF system.

Non-transitory, tangible computer readable media containing computer programming instructions which, when read by a computer system causes the computer system to implement one or more of the functions described herein for the computer network system.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings illustrate illustrative embodiments. They do not illustrate all embodiments. Other embodiments may be used in addition or instead. Details which may be apparent or unnecessary may be omitted to save space or for more effective illustration. Some embodiments may be practiced with additional components or steps and/or without all of the components or steps which are illustrated. When the same numeral appears in different drawings, it refers to the same or like components or steps.

DETAILED DESCRIPTION OF ILLUSTRATIVE EMBODIMENTS

Illustrative embodiments are now described. Other embodiments may be used in addition or instead. Details which may be apparent or unnecessary may be omitted to save space or for a more effective presentation. Some embodiments may be practiced with additional components or steps and/or without all of the components or steps which are described.

Figure 1:
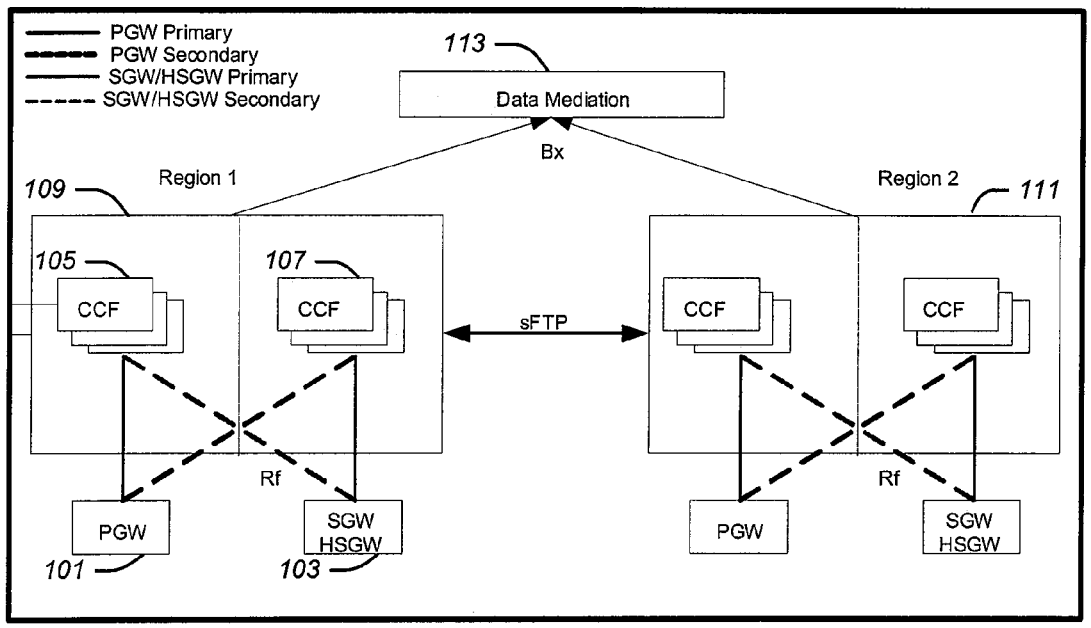
FIG. 1 illustrates an example of components in a computer network system which may be configured to generate Account Request (ACR) messages and associated Charging Data Records (CDRs) relating to chargeable sessions which take place in the computer network system.

FIG. 1 illustrates an example of components in a computer network system which may be configured to generate Account Request (ACR) messages and associated Charging Data Records (CDRs) relating to chargeable sessions which take place in the computer network system.

As illustrated in FIG. 1, one or more Charge Trigger Function (CTF) systems, such as a Packet Data Network Gateway (PGW) 101 and a Serving Gateway (SGW) or High Rate Packet Data Serving Gateway (HSGW) 103 may be configured to generate a set of Accounting Request (ACR) messages in connection with a chargeable session on the computer network system. Other types of CTF systems may be used in addition or instead, such as an Application Services (AS) system.

Each set of ACR messages may be delivered from the CTF system to a Primary Charge Collection Function (CCF) system or, in the event of a problem with the primary CCF system, to a secondary CCF system. As illustrated in FIG. 1, a CCF system 105 may serve as a primary CCF system to the PGW 101 and as a secondary CCF system to the SGW/HSGW 103. Similarly, a CCF system 107 may serve as the primary CCF system to the SGW/HSGW 103 and as a secondary CCF system to the PGW 101. The CCF systems 105 and 107 are illustrated with cascading squares to indicate each CCF system may, in fact, constitute a set of CCF systems. The significant of these groups of CCF system will be discussed below in connection with FIG. 2.

Each CTF system may be configured to normally direct its ACR messages to a primary CCF system and, in the event of a problem with the primary CCF system, to a secondary CCF system.

PGW 101, SGW/HSGW 103, CCF 105, and CCF system 107 may be part of a first region 109 within the computer network system. The computer network system may include other regions, such as a second region 111, which may be similarly configured, as illustrated in FIG. 1, or configured differently.

Each CCF system may be configured to receive and correlate the ACR messages which it receives from the CTF systems and to generate a Charging Data Record (CDR) for each chargeable session, based on the ACR messages received for that session from one of the CTF systems. Each CCF system may be configured to deliver each CDR which it generates to a data mediation (DM) system 113 for further processing, as also illustrated in FIG. 1.

Figure 2:
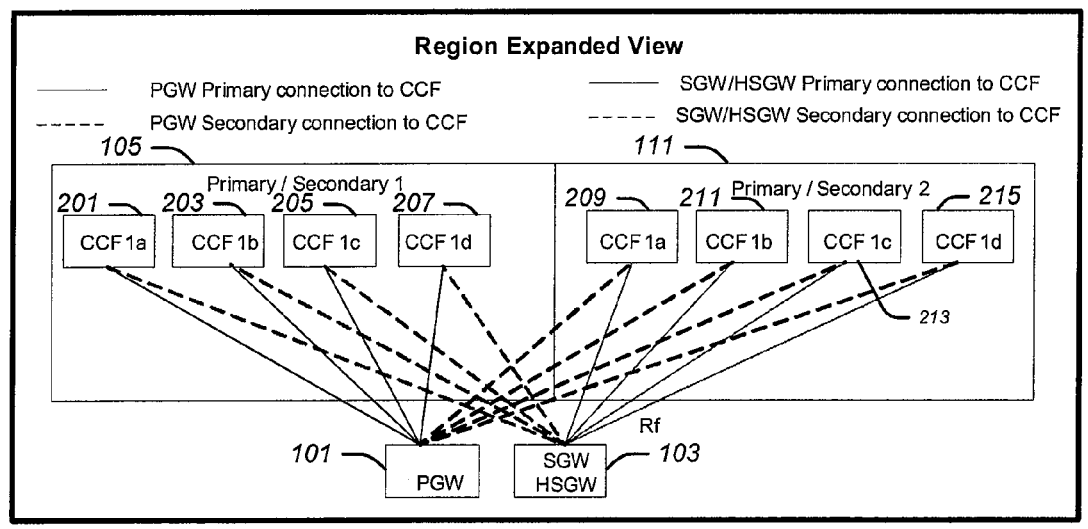
FIG. 2 illustrates an expanded view of one of the regions illustrated in FIG. 1.

FIG. 2 illustrates an expanded view of one of the regions illustrated in FIG. 1. As illustrated in FIG. 2, each CCF system may, in fact, include a group of CCF systems. For example, CCF system 105 may include CCF systems 201, 203, 205, and 207. Similarly, CCF system 107 may include CCF systems 209, 211, 213, and 215. The particular CCF system within a group of CCF systems to which a set of ACR messages is sent by one of the CTF systems may depend upon load balancing and/or other considerations. The particular selection of the CCF system within a group of CCF systems may be made by the CTF system which sends the set of ACR messages, by a system which is external to the CTF system, or by a combination of both.

Figure 3:
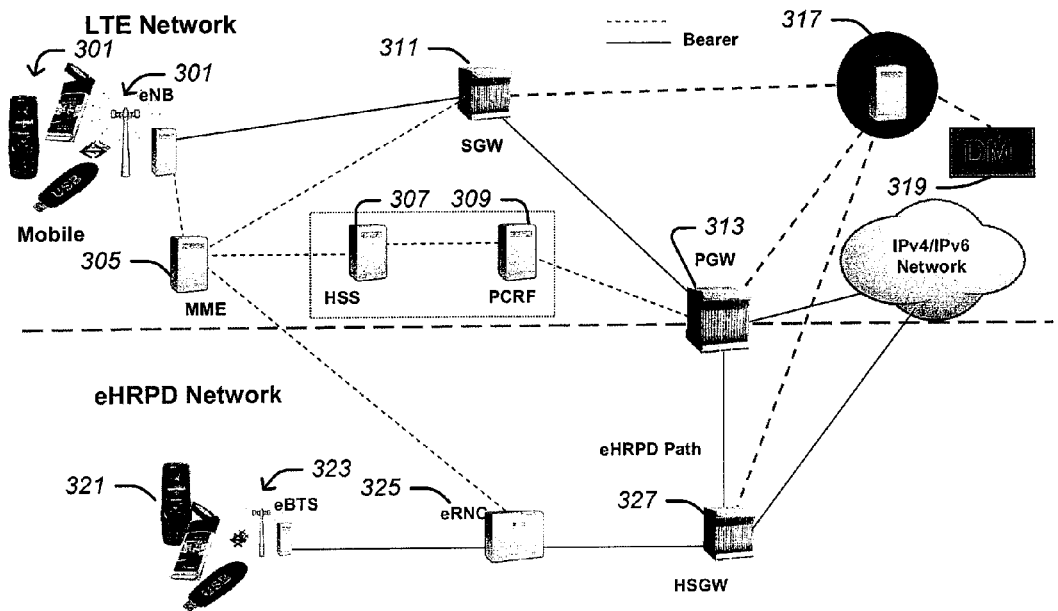
FIG. 3 illustrates an example of components in a combined Long Term Evolution (LTE) computer network system and an evolved High Rate Packet Data (eHRPD) computer network system which may be configured to generate Account Request (ACR) messages and associated Charging Data Records (CDRs) relating to chargeable sessions which take place in the combined computer network system.

FIG. 3 illustrates an example of components in a combined Long Term Evolution (LTE) computer network system and an evolved High Rate Packet Data (eHRPD) computer network system which may be configured to generate ACR messages and associated CDRs relating to chargeable sessions which take place in the combined computer network system.

As illustrated in FIG. 3, the LTE computer network system may include one or more wireless mobile communication devices 301, one or more base stations for communicating with one or more of the wireless mobile communication devices 301, such as a base station 303, a Mobility Management Entity (MME) 305 for controlling the LTE Network, a Home Subscriber Server (HSS) for sharing and consolidating real-time subscriber information, a Policy and Charging Rules Function (PCRF) system that detects service flow and enforces charging policies, a Serving Gateway (SGW) 311, a Packet Data Network Gateway (PGW) 313, a CCF system 317, and a Data Management (DM) system 319.

The eHRPD computer network system may similarly include one or more mobile communication devices 321 which may communicate with one or more base station, such as a base station 323, an evolved Radio Network Controller (rNC) 325, and an eHRPD Serving Gateway (HSGW) 327.

The SGW 311, the PGW 313, and the HSGW 327 may function as CTF systems and may perform the operations performed above in connection with them. The CCF 317 may similarly perform the operations described above in connection with CCF systems. The remaining components may perform the functions which are commonly associated with them.

Figure 4:
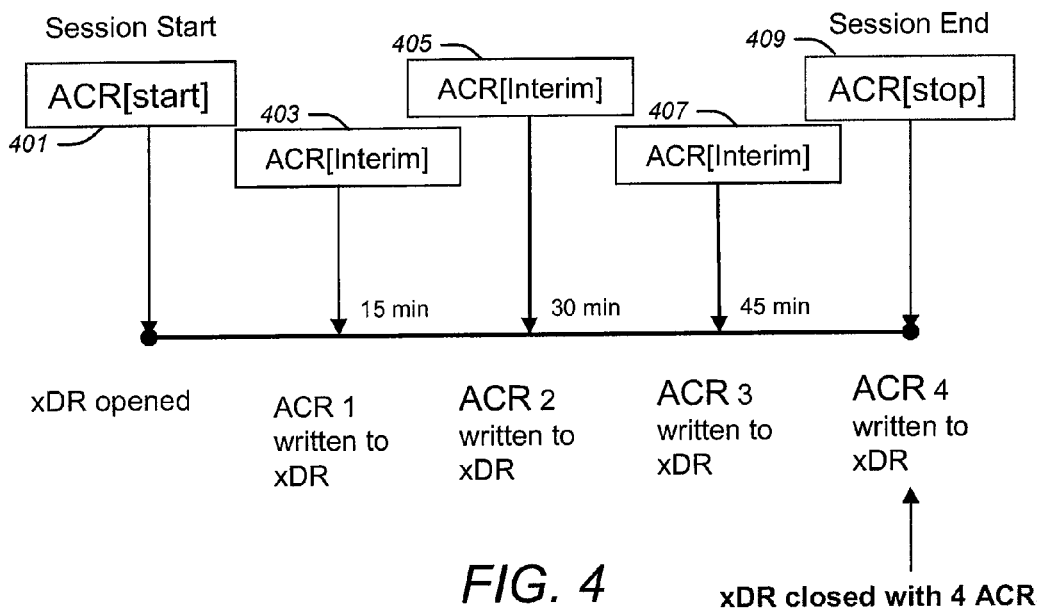
FIG. 4 illustrates an example of a set of Account Requests (ACR) messages which have been sent by a Charge Trigger Function (CTF) system in connection with a single charging session to a primary Charge Collection Function (CCF) system during normal operation of the CTF system.

FIG. 4 illustrates an example of a set of ACR messages which have been sent by a CTF system in connection with a single charging session to a primary CCF system during normal operation of the CTF system. As illustrated in FIG. 4, these ACR messages may include an ACR Start message 401 indicating the start of the chargeable session, ACR Interim messages 403, 405, and 407, each indicating continuation of the chargeable session, and an ACR Stop message 407 indicating the end of the chargeable session. In connection with other chargeable sessions, there may only be a single ACR message, only an ACR Start and an ACR Stop message, or a different number of ACR Interim messages, such as one, four, or more. The complete set of ACR messages that are sent in connection with a chargeable session may be representative of a single CDR.

Figure 5:
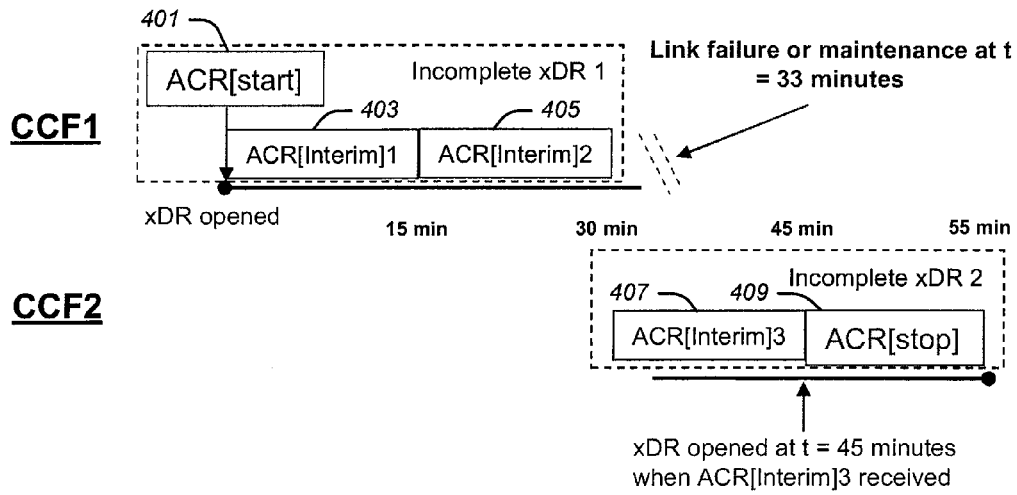
FIG. 5 illustrates a prior art example of the same set of Account Requests (ACR) messages which are illustrated in FIG. 4 being sent by the same Charge Trigger Function (CTF) system relating to the same chargeable session, but which have been split between a primary Charge Collection Function system (CCF1) and a secondary Charge Collection Function system (CCF2) as a result of interrupted service at the primary CCF system (CCF1).

FIG. 5 illustrates a prior art example of the same set of ACR messages which are illustrated in FIG. 4 being sent by the same CTF system relating to the same chargeable session. However, these ACR messages have been split between a primary CCF system (CCF1) and a secondary CCF system (CCF2) as a result of interrupted service at the primary CCF system (CCF1). As illustrated in FIG. 5, the CTF system which generated the ACR messages began by directing these messages to the primary CCF system (CCF1). After delivery of the second ACR Interim messages 405, however, service by the primary CCF system (CCF1) was interrupted due to maintenance or an upgrade.

Detection of this interruption by the CTF system which was sending these ACR messages has caused this CTF system to deliver the remaining ACR messages which are part of the same chargeable session to the secondary CCF system (CCF2). This results in the set of ACR messages relating to the same chargeable session being split between the primary CCF system (CCF1) and the secondary CCF system (CCF2). However, the set of ACR messages on the primary CCF system (CCF1) and the secondary CCF system (CCF2) are both incomplete. The set of ACR messages on the primary CCF system (CCF1) lack an ACR Stop message, while the set of ACR messages on the secondary CCF system (CCF2) lack an ACR Start message. Both the primary CCF system (CCF1) and the secondary CCF system (CCF2) may then be unable to generate a CDR for this chargeable session.

Such a CDR may subsequently be generated, if at all, as a result of an effort to match otherwise incomplete ACR message sets. As indicated in the Description of Related Art section above, however, this matching can consume processing time which can be costly. It can also be unsuccessful, which may result in lost revenue for otherwise chargeable sessions.

Figure 6:
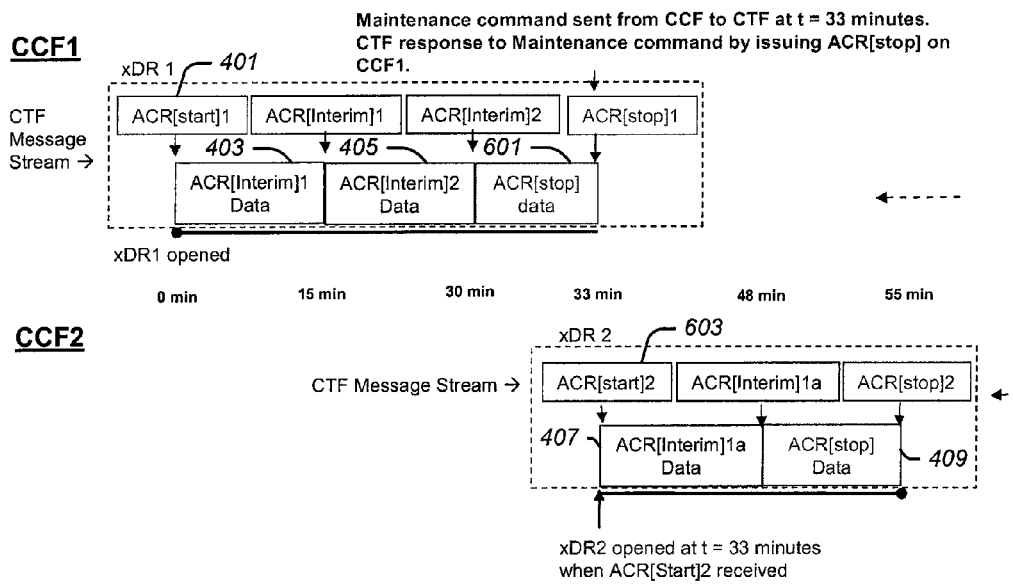
FIG. 6 illustrates an example of two complete sets of Account Requests (ACR) messages which have been sent by a Charge Trigger Function (CTF) system relating to the same chargeable session as illustrated in FIG. 4, but with one complete set being sent to a primary Charge Collection Function system (CCF1) and the other complete set being sent to a secondary Charge Collection Function system (CCF2), as a result of the same interrupted service which is illustrated in FIG. 5.

FIG. 6 illustrates an example of two complete sets of Account Requests (ACR) messages which have been sent by a CTF system relating to the same chargeable session as illustrated in FIG. 4, but with one complete set being sent to a primary CCF system (CCF1) and the other complete set being sent to a secondary CCF system (CCF2), all as a result of the same interrupted service which is illustrated in FIG. 5.

As illustrated in FIG. 6, the same ACR Start message 401, ACR Interim message 403, and ACR Interim message 405 have been sent to the same primary CCF system (CCF1) before service at the primary CCF system (CCF1) has been interrupted. This may be part of the normal function of the CTF system.

The CTF system, however, may then receive a notice indicating that the primary CCF system (CCF1) is expected to shut down soon. This notice may be received after the CTF system delivers the ACR Start message 401 and the ACR Interim messages 403 and 405, but before the CTF system delivers the remaining ACR Interim message 407 and the ACR Stop message 409 relating to the same chargeable session.

In response to this shut down notice, the CTF may be configured to next send an ACR Stop message 601 to the primary CCF system (CCF1), as illustrated in FIG. 6. In further response to this shut down notice, the CTF system may be configured to next send an additional ACR Start message 603, the remaining ACR Interim message 407, and the ACR Stop message 409 to the secondary CCF system (CCF2).

As illustrated in FIG. 6, this may result in two complete sets of ACR messages being sent by the CTF system relating to the same chargeable session, one set being sent to the primary CCF system (CCF1), and the other set being sent to the secondary CCF system (CCF2). No effort to correlate these two sets of ACR messages need thereafter be made. Instead, the primary CCF system (CCF1) and the secondary CCF system (CCF2) may each generate a separate CDR for the set of ACR messages which they received and forward these on to a Data Mediation system, such as to the Data Mediation system 113 illustrated in FIG. 1. As also illustrated in FIG. 6, the shutdown notice may not cause any incomplete set of ACR messages to be received by either the primary CCF system (CCF1) or the secondary CCF system (CCF2).

The shutdown notice to the CTF system may come from any source. For example, the primary CCF system (CCF1) may be configured to issue this shutdown notice upon request of a user. As indicated above, a user may cause such a request to be issued when planning to shut down the primary CCF system (CCF1), for example, for maintenance or upgrades. The shutdown notice may be issued in any way, such as by using network protocols such as TCP/UDP.

The computer network system may include a plurality of CTF systems. Several of these CTF systems may be configured to normally deliver their sets of ACR messages to the same primary CCF system, such as to the CCF system 105 illustrated in FIG. 1. In this case, the primary CCF system may be configured to deliver the shutdown notice to each of the CTF systems which, at the time the shutdown notice is delivered, has delivered to the primary CCF system an incomplete set of ACR messages and/or which has an open, inbound TCP connection to the primary CCF system.

Before shutting down, the primary CCF system (CCF1) may be configured to generate a list of all CDRs which have been started by a Received ACR Start message, but which have not been completed by the receipt of a received ACR Stop message relating to the same chargeable session. Similarly, before the primary CCF system (CCF1) is expected to shut down, the primary CCF system (CCF1) may be configured to generate a list of all open, inbound TCP connections from the CTF systems to the primary CCF system.

The various systems which have been described herein, such as the CTF systems such as the SGWs, PGWs, and HSGWs, the MME system, the HHS system, the PCRF system, the eRNC system, the CCF systems, and the Data Mediation system, may include computer hardware and software configured to perform the functions of these systems as described herein and as otherwise well known. The computer hardware may include one or more microprocessors, support chips, RAMS, ROMS, ePROMS, hard disk drives, CD drives, DVD drives, network interfaces, keyboards, mice, displays, and other computer hardware components. The computer software may include one or more operating systems and application programs, again configured to cause the computer hardware in which they are loaded to perform the functions recited herein.

Non-transitory, tangible computer-readable media may contain computer programming instructions which, when read by a computer system, causes the computer system to perform one or more of the functions recited herein. The non-transitory, tangible, computer-readable media may consist of or include one or more disk drives, CDs, DVDs, flash memories, ROMS, ePROMS, and/or any other type of non-transitory, tangible, computer-readable media devices.

The components, steps, features, objects, benefits and advantages which have been discussed are merely illustrative. None of them, nor the discussions relating to them, are intended to limit the scope of protection in any way. Numerous other embodiments are also contemplated. These include embodiments which have fewer, additional, and/or different components, steps, features, objects, benefits and advantages. These also include embodiments in which the components and/or steps are arranged and/or ordered differently.

For example, the CTF can also display to the CTF operator that a shutdown message has been sent and the selected secondary CCF that new and existing usage records will be sent to. This may facilitate debugging and validation of ACR usage record migration from primary to secondary. Aggregation of reports form all remote CTF systems can be performed by iterating through the log files. These reports can be used to trend outage conditions in the network over time.

Unless otherwise stated, all measurements, values, ratings, positions, magnitudes, sizes, and other specifications which are set forth in this specification, including in the claims which follow, are approximate, not exact. They are intended to have a reasonable range which is consistent with the functions to which they relate and with what is customary in the art to which they pertain.

All articles, patents, patent applications, and other publications which have been cited in this disclosure are incorporated herein by reference.

The phrase "means for" when used in a claim is intended to and should be interpreted to embrace the corresponding structures and materials which have been described and their equivalents. Similarly, the phrase "step for" when used in a claim is intended to and should be interpreted to embrace the corresponding acts which have been described and their equivalents. The absence of these phrases in a claim mean that the claim is not intended to and should not be interpreted to be limited to any of the corresponding structures, materials, or acts or to their equivalents.

None of the claims are intended to embrace non-statutory subject matter, such as an abstract idea, law of nature or natural phenomena; obvious subject matter; nor subject matter lacking novelty, nor should they be interpreted in such a way. Any unintended embracement of such subject matter is hereby disclaimed.

Except as stated immediately above, nothing which has been stated or illustrated is intended or should be interpreted to cause a dedication of any component, step, feature, object, benefit, advantage, or equivalent to the public, regardless of whether it is recited in the claims.

The scope of protection is limited solely by the claims which now follow. That scope is intended and should be interpreted to be as broad as is consistent with the ordinary meaning of the language which is used in the claims when interpreted in light of this specification and the prosecution history which follows and to encompass all structural and functional equivalents.

The invention claimed is:

1. A computer network system for generating Charging Data Records (CDRs), the computer network system comprising:
    a primary Charge Collection Function (CCF) system comprising a first processor configured to receive and correlate Account Request messages (ACRs) relating to a chargeable session and to generate CDRs, wherein each CDR providing information about the chargeable session in the network system is based on a set of ACRs relating to the same chargeable session and each set of ACRs includes at least an ACR Start message indicating the start of the chargeable session and an ACR Stop message indicating the end of the chargeable session;
    a secondary CCF system comprising a second processor configured to receive and correlate ACRs and to generate CDRs, each CDR based on a received set of ACRs relating to the same chargeable session; and
    a Charge Trigger Function (CTF) system comprising a third processor configured to:
        generate sets of ACRs and to normally deliver each set to the primary CCF system; and
        in response to a shutdown notice indicating that the primary CCF system is expected to shutdown, received after the CTF system delivers an ACR Start message to the primary CCF system but before the CTF system delivers an ACR Stop message relating to the same chargeable session to the primary CCF system:
            deliver an ACR Stop message relating to the same chargeable session to the primary CCF system before the primary CCF system shuts down; and
            deliver an additional ACR Start message and an ACR Stop message relating to the same chargeable session to the secondary CCF system.

2. The computer network system of claim 1 wherein the set of ACR messages includes an ACR Interim message between the ACR Start and Stop messages indicating the continuation of the chargeable session, the shutdown notice is received before the ACR interim message is sent, and the CTF system is configured after receipt of the shutdown notice not to deliver the ACR Interim message to the primary CCF system but to deliver it to the secondary CCF system.

3. The computer network system of claim 1 wherein the CTF system is a Serving Gateway (SGW).

4. The computer network system of claim 1 wherein the CTF system is a Packet Data Network Gateway (PGW).

5. The computer network system of claim 1 wherein the CTF system is part of a Long Term Evolution (LTE) network.

6. The computer network system of claim 1 wherein the CTF system is part of an evolved High Rate Packet Data (eHRPD) network.

7. The computer network system of claim 1 comprising a plurality of CTF systems, and wherein the primary CCF system is configured, in response to the shutdown notice, to generate a list of all CDRs which have been started by a received ACR Start message but not completed by the receipt of a received ACR Stop message relating to the same chargeable session.

8. The computer network system of claim 1 comprising a plurality of CTF systems, and wherein the primary CTF system is configured, in response to the shutdown notice, to generate a list of all open, inbound TCP connections to the CTF systems.

9. The computer network system of claim 1 wherein the shutdown notice does not cause any incomplete sets of ACR messages to be received on the primary CCF system.

10. The computer network system of claim 1 wherein the shutdown notice does not cause any incomplete sets of ACR messages to be received on the secondary CCF system.

11. The computer network system of claim 1 wherein the primary CCF system is configured to deliver the shutdown notice upon user request.

12. The computer network system of claim 11 comprising a plurality of CTF systems, and wherein the primary CCF system is configured to deliver the shutdown notice to each of the CTF systems which, at the time the shutdown notice is delivered, has delivered to the primary CCF system an incomplete set of ACR messages.

13. The computer network system of claim 11 comprising a plurality of primary CTF systems, and wherein the primary CCF system is configured to deliver the shutdown notice to each of the CTF systems which, at the time the shutdown notice is delivered, has an open, inbound TCP connection to the primary CCF system.

14. A Charge Trigger Function (CTF) system comprising a processor configured to:
  generate sets of Account Request (ACR) messages, each set including at least an ACR Start message indicating the start of a chargeable session on a network system and an ACR Stop message indicating the end of the chargeable session,
  to normally deliver each set to a primary Charge Collection Function (CCF) system configured to receive and correlate ACRs and to generate Charging Data Records (CDRs), each based on a received set of ACRs relating to the same chargeable session; and
  in response to a shutdown notice indicating that the primary CCF system is expected to shutdown, received after the CTF system delivers an ACR Start message to the primary CCF system but before the CTF system it delivers an ACR Stop message relating to the same chargeable session to the primary CCF system:
    deliver an ACR Stop message relating to the same chargeable session to the primary CCF system before the primary CCF system shuts down; and
    deliver an additional ACR Start message and an ACR Stop message relating to the same chargeable session to a secondary CCF system configured to receive and correlate ACRs and to generate Charging Data Records (CDRs), each based on a received set of ACRs relating to the same chargeable session.

15. Non-transitory, tangible computer readable media containing computer programming instructions which, when read by a computer system causes the computer system to:
  generate sets of Account Request (ACR) messages, each set including at least an ACR Start message indicating the start of a chargeable session on a network system and an ACR Stop message indicating the end of the chargeable session,
  to normally deliver each set to a primary Charge Collection Function (CCF) system configured to receive and correlate ACRs and to generate Charging Data Records (CDRs), each based on a received set of ACRs relating to the same chargeable session; and
  in response to a shutdown notice indicating that the primary CCF system is expected to shutdown, received after the CTF system delivers an ACR Start message to the primary CCF system but before the CTF system it delivers an ACR Stop message relating to the same chargeable session to the primary CCF system:
    deliver an ACR Stop message relating to the same chargeable session to the primary CCF system before the primary CCF system shuts down; and
    deliver an additional ACR Start message and an ACR Stop message relating to the same chargeable session to a secondary CCF system configured to receive and correlate ACRs and to generate Charging Data Records (CDRs), each based on a received set of ACRs relating to the same chargeable session.

* * * * *